(12) United States Patent
Livas et al.

(10) Patent No.: US 7,970,025 B2
(45) Date of Patent: Jun. 28, 2011

(54) SYSTEM AND METHOD FOR TUNING ADJUSTING THE CENTRAL FREQUENCY OF A LASER WHILE MAINTAINING FREQUENCY STABILIZATION TO AN EXTERNAL REFERENCE

(75) Inventors: Jeffrey Livas, Severna Park, MD (US); James I. Thorpe, Rockville, MD (US); Kenji Numata, College Park, MD (US)

(73) Assignee: The United States of America as represented by the Administrator of The National Aeronautics and Space Administration, Washington, DC (US)

( * ) Notice: Subject to any disclaimer, the term of this patent is extended or adjusted under 35 U.S.C. 154(b) by 95 days.

(21) Appl. No.: 12/496,954

(22) Filed: Jul. 2, 2009

(65) Prior Publication Data
US 2010/0135342 A1 Jun. 3, 2010

Related U.S. Application Data

(60) Provisional application No. 61/077,926, filed on Jul. 3, 2008.

(51) Int. Cl.
*H01S 3/10* (2006.01)

(52) U.S. Cl. .. 372/20; 372/26; 372/29.016; 372/29.023; 372/32

(58) Field of Classification Search .................... 372/20, 372/26, 29.016, 29.023
See application file for complete search history.

(56) References Cited

U.S. PATENT DOCUMENTS
6,762,869 B2 * 7/2004 Maleki et al. ............... 359/239
2006/0192970 A1 * 8/2006 Tiemann ...................... 356/454

OTHER PUBLICATIONS

Black, Eric D., "An Introduction to Pound-Drever-Hall laser frequency stabilization", American Association of Physics Teachers, Jan. 2001, pp. 79-87, vol. 69 No. (1), USA.
Drever, R.W.P. et al., "Laser Phase and Frequency Stabilization Using an Optical Resonator," Applied Physics B, Springer-Verlag, 1983, pp. 97-105, vol. B No. (31), USA.

* cited by examiner

*Primary Examiner* — Dung T Nguyen
(74) *Attorney, Agent, or Firm* — Matthew F. Johnston

(57) ABSTRACT

A method and system for stabilizing a laser to a frequency reference with an adjustable offset. The method locks a sideband signal generated by passing an incoming laser beam through the phase modulator to a frequency reference, and adjusts a carrier frequency relative to the locked sideband signal by changing a phase modulation frequency input to the phase modulator. The sideband signal can be a single sideband (SSB), dual sideband (DSB), or an electronic sideband (ESB) signal. Two separate electro-optic modulators can produce the DSB signal. The two electro-optic modulators can be a broadband modulator and a resonant modulator. With a DSB signal, the method can introduce two sinusoidal phase modulations at the phase modulator. With ESB signals, the method can further drive the optical phase modulator with an electrical signal with nominal frequency $\Omega_1$ that is phase modulated at a frequency $\Omega_2$.

20 Claims, 6 Drawing Sheets

SINGLE SIDEBAND (SSB)

DUAL SIDEBAND (DSB)

ELECTRONIC SIDEBAND (ESB)

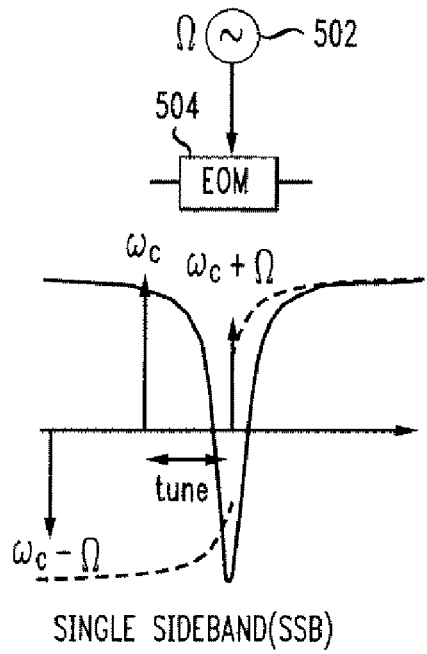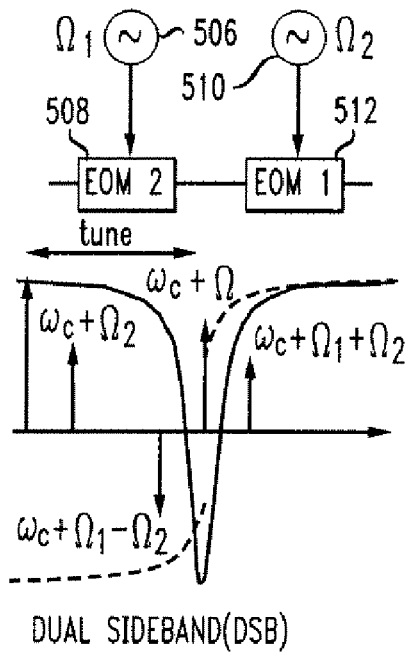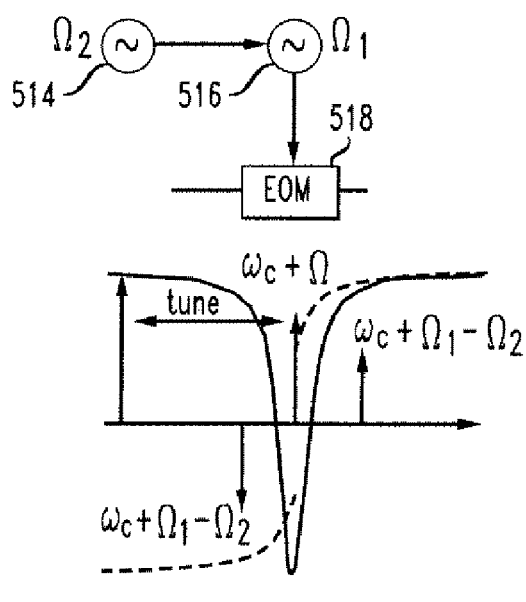

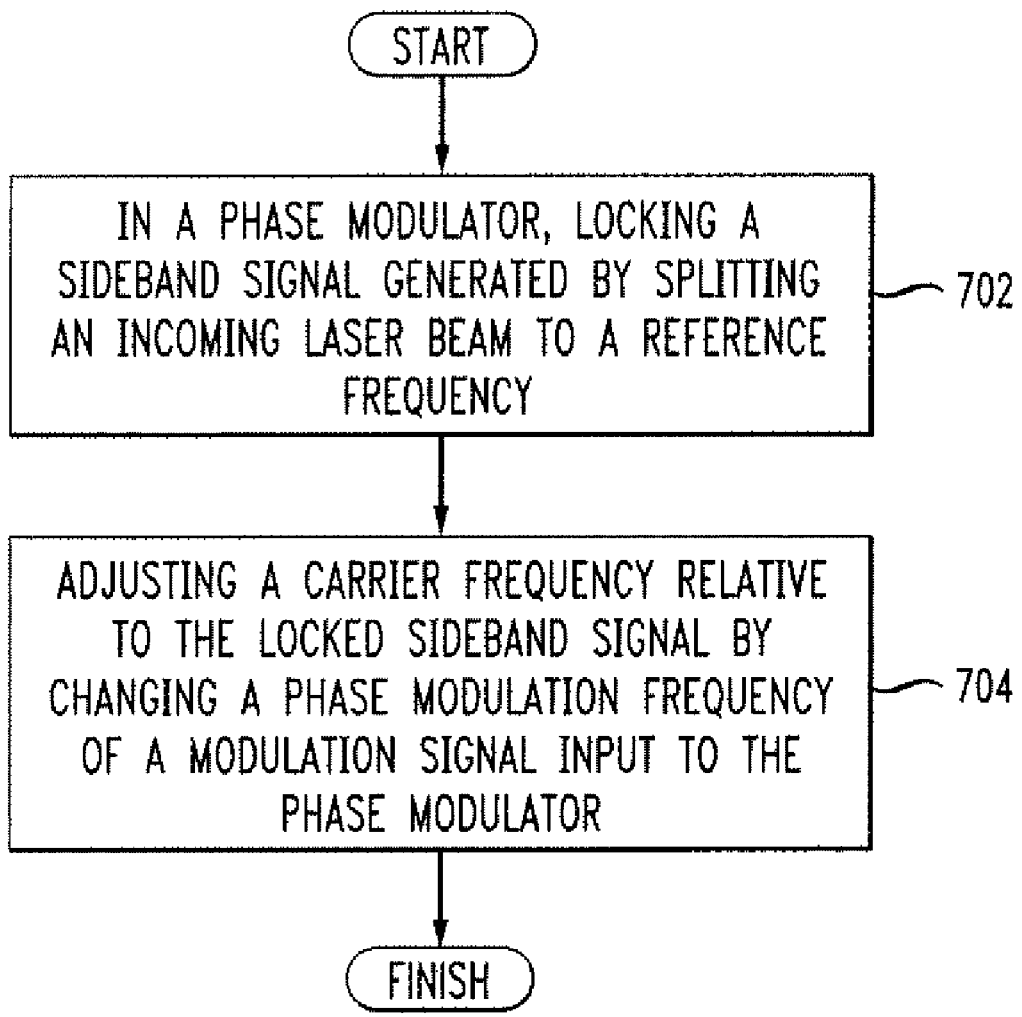

SYSTEM AND METHOD FOR TUNING ADJUSTING THE CENTRAL FREQUENCY OF A LASER WHILE MAINTAINING FREQUENCY STABILIZATION TO AN EXTERNAL REFERENCE

RELATED APPLICATION

This application claims benefit of the filing date of provisional application 61/077,926, filed 3 Jul. 2008, which is incorporated herein by reference.

ORIGIN

The disclosure described herein was developed by employees of the United States Government and may be manufactured and used by or for the United States Government for governmental purposes without the payment of any royalties thereon or therefore.

BACKGROUND

1. Technical Field

The present disclosure relates to lasers and more specifically to adjusting the central frequency of a laser while maintaining frequency stabilization to an external reference.

2. Introduction

In the field of communications between multiple spacecraft, lasers currently provide one possible communications medium. Lasers known in the art are unable to frequency stabilize and still vary the central frequency so as to achieve a heterodyne beat frequency within the radio frequency (RF) bandwidth of a photodetector and transfer the frequency reference from a local on-board source, such as a Fabry-Perot cavity, to an non-local source. One example of a non-local source for one spacecraft is a laser beam from a second spacecraft.

One known frequency stabilization approach controls some property of the laser (pump current, temperature, etc.) to keep the laser frequency/wavelength matched to a reference frequency or length. Some commonly used frequency reference sources include spectroscopic references such as molecular or atomic absorption and length references such as Fabry-Perot cavities or Michelson interferometers. However, one problem with these approaches is that the available reference frequencies are fixed.

Another known laboratory-based approach to frequency tuning modifies the frequency reference in order to tune the frequency of the resonant features. One example of this is adding a piezoelectric element to the spacer in a Fabry-Perot cavity. However, this approach generally has a detrimental effect on stability and reduces the noise performance of the stabilization system.

Yet another alternative approach stabilizes the laser to a fixed frequency reference and uses a frequency-tuning element, such as an acousto-optic device or phase-locked slave laser, to adjust the output laser frequency. This approach generally increases the complexity of the system by adding additional components that consume volume, mass and power. For example, acousto-optic devices in particular require large amounts of RF power. While additional volume, mass, and power are not necessarily of much concern in terrestrial applications, they are particularly valuable resources in space-based applications. In space-based applications, every additional kilogram requires a huge expense to launch to space and every additional watt requirement leads to additional mass in the form of batteries, solar panels, or other power-providing means. Accordingly, what is needed in the art is an improved, lower complexity, lower mass, more power efficient, tunable frequency-stabilized laser.

SUMMARY

Additional features and advantages of the disclosure will be set forth in the description which follows, and in part will be clear from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present invention is directed to a method sand system for stabilizing a laser to a frequency reference with an adjustable offset. The method locks a sideband signal generated by passing an incoming laser beam through a phase modulator to a frequency reference, and adjusts a carrier frequency relative to the locked sideband signal by changing a phase modulation frequency input to the phase modulator. The sideband signal can be a single sideband (SSB), dual sideband (DSB), or an electronic sideband (ESB) signal. Two separate electro-optic modulators can produce the DSB signal. In one aspect, at least one EOM has a bandwidth that is as large as the desired frequency tuning range. The two electro-optic modulators can be a broadband modulator and a resonant modulator. Further in the case of a DSB signal, the method can further introduce two sinusoidal phase modulations at the phase modulator. With ESB signals, the method can further drive the optical phase modulator with an electrical signal with nominal frequency $\Omega_1$ that is phase modulated at a frequency $\Omega_2$. Using the approaches disclosed herein, the system can operate on hundreds or even thousands of frequencies which would require multiple separate systems using other techniques. Due to this enhanced flexibility, many projects requiring lasers can reuse the same parts and avoid adding extra equipment and overhead.

One advantage is the ability to tune the center frequency without sacrificing the in-band noise performance of the stabilization system. The disclosure includes a class of techniques to stabilize a laser frequency to a fixed optical cavity resonance with an adjustable offset. This approach can provide a wide tuning range for the central frequency. These techniques have the advantage of not altering the intrinsic stability of the frequency reference. These sideband techniques can perform comparably to the standard, non-tunable Pound-Drever-Hall technique, each providing more than four decades of frequency noise suppression over the free-running noise.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5A illustrates an exemplary SSB implementation;

FIG. 5B illustrates an exemplary DSB implementation;

FIG. 5C illustrates an exemplary ESB implementation;

FIG. 7 illustrates an exemplary method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

Figure 1:
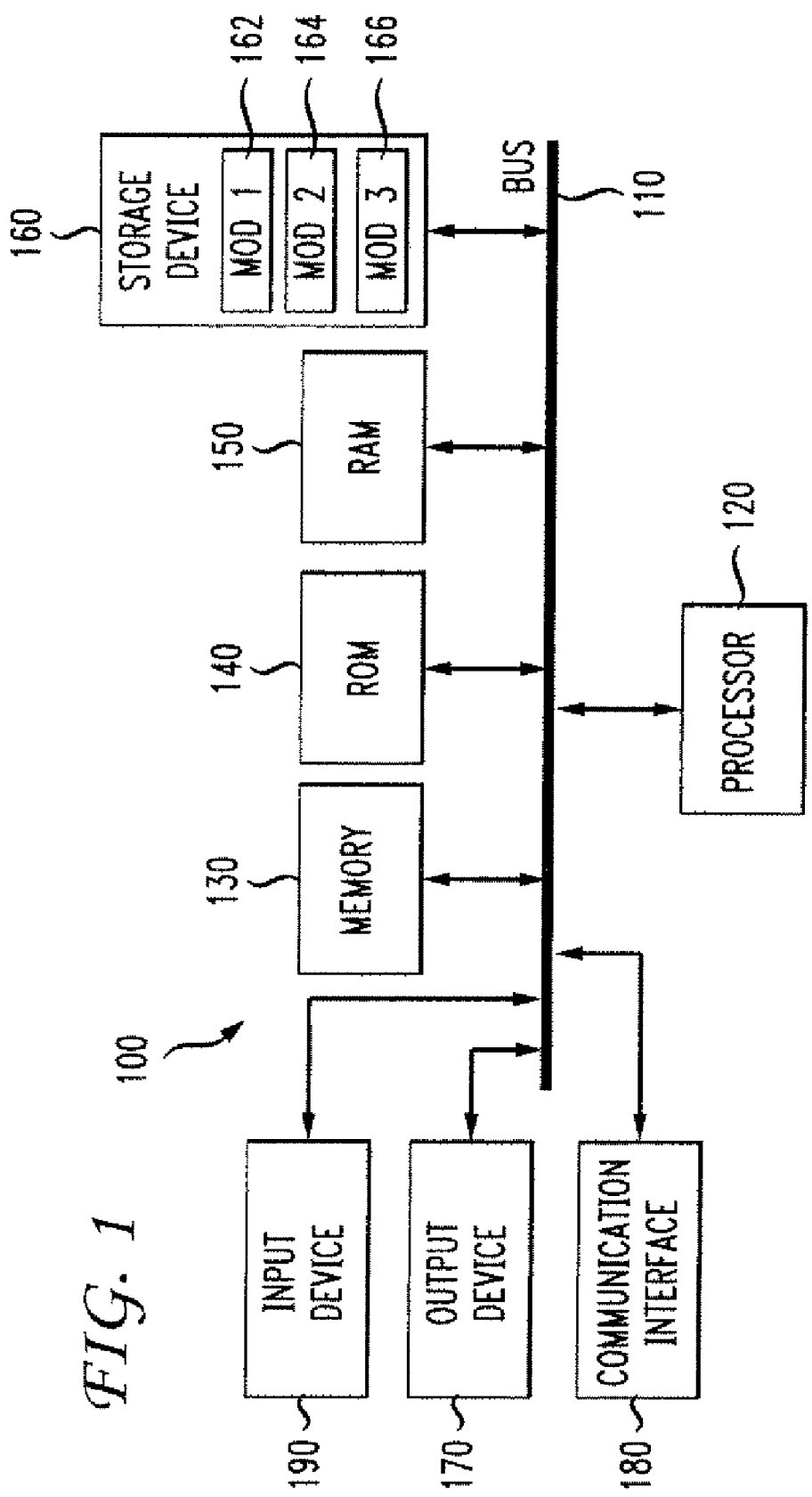
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can he configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 1.60 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable storage medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments y include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can he a part of the recited systems,and/or can operate according to instructions in the recited tangible computer-readable storage media.

Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations. The embodiments disclosed herein can address a need in spacecraft-based gravity wave detection, such as the Laser Interferometer Space Antenna (LISA) project at NASA. In one embodiment, three spacecraft orbit the Sun in independent orbits, maintaining a triangle configuration. As the triangle configuration rotates around sun, the spacecraft send laser beams between each other to measure distance or range. The measurement principal employed by LISA is two-way Doppler ranging in which each spacecraft contains a laser operating at a specific frequency and makes a measurement of the difference in frequency between its local laser light and the laser light received from the distant spacecraft. This technique requires that the absolute frequencies of the two lasers be matched to within the bandwidth of the detectors. Consequently, it can be useful to have the capability to tune the frequency of one or both lasers to obtain a match. Additionally, the sensitivity of the distance measurement made with this technique can be limited by fluctuations in the frequency of the individual lasers. Lasers used in these applications can be frequency-stabilized to improve sensitivity. The approaches described herein allow for a laser that is simultaneously frequency-stabilized and frequency tunable.

The principles described herein are an extension of a method for precision frequency stabilization that is used in the precision time and frequency standard community called Pound-Drever-Hall (PDH) locking, as described by R. Dreyer, J. Hall, F. Kowalski, J. Hough, G. Ford, A. Munley, and H. Ward, in "Laser phase and frequency stabilization using an optical resonator", Applied Physics B 31, pp 97-105 (1983), and described by E. Black in "An introduction of Pound-Drever-Hall laser frequency stabilization," Am. Journ. Phys, 69, pp 79-87 (2001), both of which are herein incorporated by reference. These techniques can result in extremely low frequency noise systems.

One of the most useful properties of laser light is that it has a single stable wavelength. For applications such as interferometry and spectroscopy, the degree to which the light source can be made monochromatic limits the precision of the overall measurement. One way to characterize the stability of a light source is with its frequency noise. The electric field associated with the light source oscillates with a nominal frequency $v_0$ and has some frequency noise characterized by a linewidth.

Various techniques are employed to reduce the linewidth of laser sources. Each of these techniques requires a frequency reference with an inherent stability that exceeds that of the free-running laser. One common such reference is an external, gain-free optical cavity constructed from dimensionally-stable materials. The length stability of the cavity can be transferred to frequency stability in the laser by tuning the laser frequency such that the round trip optical path length in the cavity is equal to an integer number of wavelengths.

One downside to using optical cavities as frequency references is that the central frequency can only be stabilized at a series of fixed points in frequency space separated by the Free Spectral Range (FSR), which for a linear two-mirror cavity is given by $$FSR \equiv \frac{c}{2L} \quad \text{Equation (1)}$$

where c is the speed of light and L is the cavity length. For certain applications, such as generating an interference between two independent laser beams or probing spectroscopic features, it is advantageous to be able to adjust $v_0$ with a resolution better than one FSR while still suppressing the free-running frequency noise. This can be accomplished by adding a frequency actuator such as an acousto-optic modulator or an offset phase-locked slave laser to an existing stabilization system. Another approach is to adjust the laser frequency by adjusting the cavity resonance frequency via changes in the length or optical index of the cavity.

A class of techniques can lock a laser to a fixed length optical cavity with a continually-tunable offset frequency. These techniques do not require additional components beyond those used in the standard cavity locking systems. They also require no modification to the optical cavity itself, preserving the dimensional stability that requires much effort to achieve.

In order to utilize an optical cavity as a frequency reference, one must generate an error signal that is proportional to the difference in frequency between the laser light and the cavity resonance. A good way to do this is to examine the light reflected from the cavity, the spectrum of which is the product of the incoming spectrum and the cavity's complex amplitude reflection coefficient, $F(\omega)$, where $\omega = 2\pi v$. The amplitude of $F(\omega)$ goes to zero at the resonance frequencies ($\omega n \equiv 2\pi v * FSR$ n=1,2,3 . . . ) and approaches unity between them. The width of the resonance is characterized by the Finesse defined as follows:

$$\text{Finesse} = \frac{FSR}{v_{FWHM}} \quad \text{Equation (2)}$$

where $V_{FWHM}$ is the full width at half minimum of $|F(\omega)|$. The phase of $F(\omega)$ contains information about whether the light frequency is above or below the resonance. The phase of $F(\omega)$ begins at $-\pi$ rad far below resonance, and increases monotonically to $-\pi/2$ rad just below resonance, goes through a discontinuity of $\pi$ rad at resonance, and increases monotonically from $\pi/2$ rad to $\pi$ rad far above resonance. A measurement of he phase shift experienced by the reflected light can be used to generate an error signal for locking to the cavity resonance.

Figure 2:
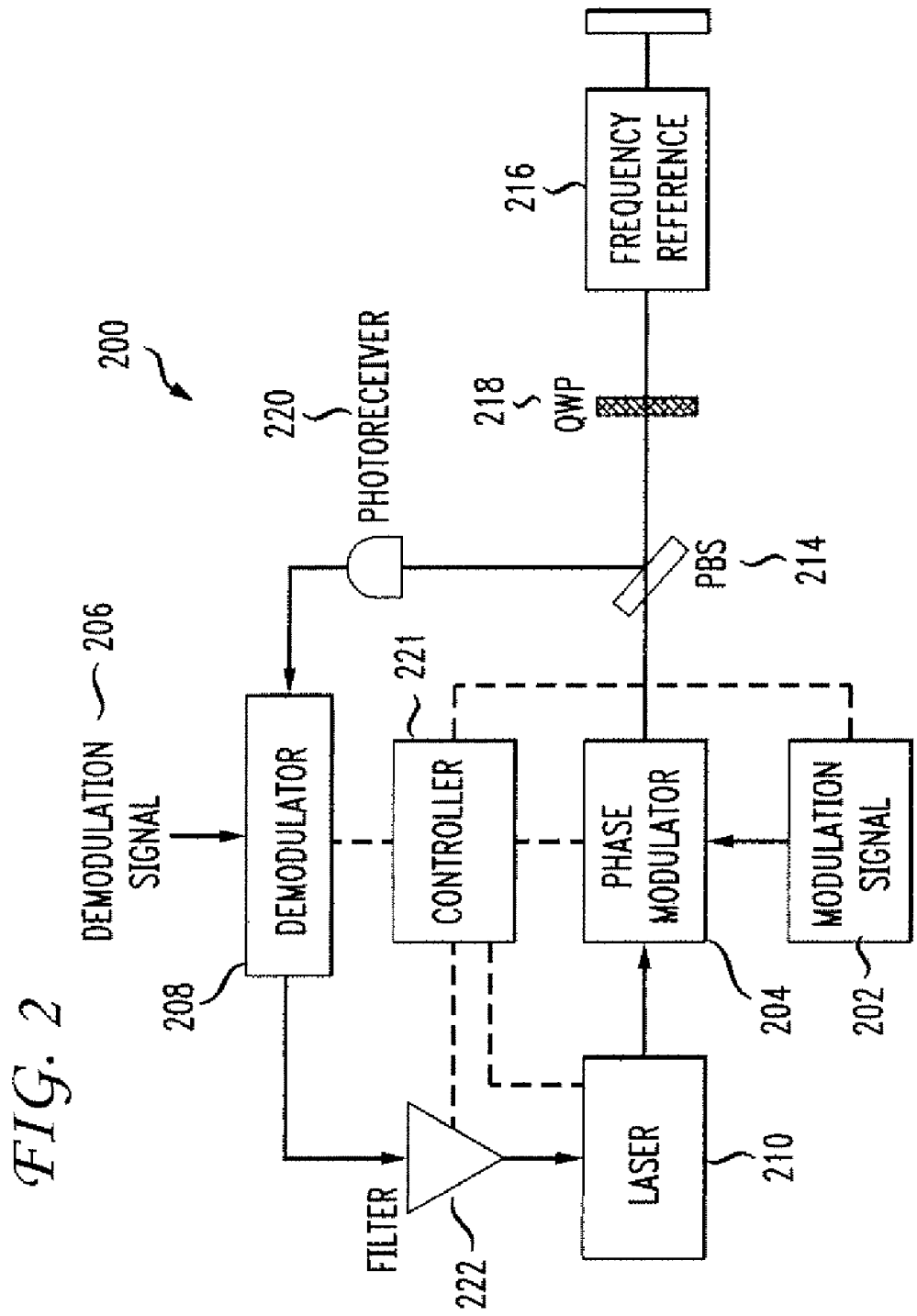
FIG. 2 illustrates an exemplary Pound-Drever-Hall (PDH) locking system.

The standard technique for locking a laser to a resonance such as that formed by a cavity is Pound-Drever-Hall (PDH) locking. FIG. 2 illustrates an exemplary implementation of the PDH locking laser technique 200 with modifications. A laser 210 produces light that is phase-modulated according to a modulation signal 202 in a phase modulator 204. Digital or analog approaches can generate the modulation signal. The modulated light is used to probe a frequency reference in reflection. The input and reflected beams are often separated in polarization using a polarizing beam splitter (PBS) 214 and a quarter-wave plate (QWP) 218. A photoreceiver 220 gathers the reflected light and converts the reflected light to an electrical signal. A demodulator 208 demodulates the photoreceiver 220 output using a demodulation signal 206. The demodulated output is used as an error signal that a filter 222 shapes before feeding the signal back to the frequency tuning port(s) of the laser 210. This implementation stabilizes a laser frequency to a reflective resonance of a frequency reference.

In order to provide frequency tunability, the PDH locking laser modifies the modulation signal 202 applied by the phase modulator 204 and the demodulation signal 206 fed to the demodulator 208. A controller 221 can direct one or more aspect of the filter 222, laser 210, demodulator 208, phase modulator 204, and/or the modulation signal 202. The controller 221 communicates with these components via any suitable communications medium, such as radio transmission or a wired connection. The communications medium can be different from and/or unrelated to the laser signal, as indicated by the dashed lines in FIG. 2 as opposed to the solid lines showing the laser path. The controller 221 can control these elements to perform synchronously to avoid imperfections in the electronic components, such as drifting offsets in the mixers.

Figure 3:
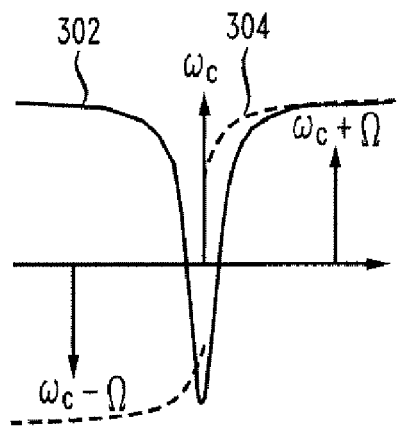
FIG. 3 illustrates an exemplary PDH locking optical frequency spectrum.

In PDH locking, the light incident on the cavity is first phase modulated, so that the electric field is of the form $$\dot{E} = \sqrt{P_0} \exp\{i[\omega_c t + \beta \sin(\Omega t)]\} \quad \text{Equation (3)}$$

where $P_0$, is the power incident on the modulator, $\omega_c$ is the angular frequency of the incoming light, $\beta$ is the modulation depth, and $\Omega$ is the angular frequency of the modulation. To first order in $\beta$, the effect of phase modulation is to split the beam into three distinct frequency components: a carrier at $\omega = \omega_c$ and two sidebands at $\omega = \omega_c \pm \Omega$. For sufficiently large $\Omega_1$, the sidebands are completely reflected when the carrier is near resonance, as shown in FIG. 3. To first order in the modulation depth, phase modulation has the effect of splitting the incoming laser beam into three distinct frequency components: a carrier at the original frequency, $\omega_c$, and two sidebands that are offset from the carrier by the modulation frequency, $\Omega$, as shown in FIG. 3. When the reflected light is demodulated at $\Omega$, an error signal is generated that is proportional to the frequency difference between the laser frequency and reference frequency. FIG. 3 illustrates an exemplary PDH locking optical frequency spectrum. The solid curve 302 represents the magnitude squared of the response of the Fabry Perot reference cavity on resonance. The dashed line 304 shows the phase response.

The modulation structures shown in FIGS. 3 and 4A-C illustrate traditional and tunable modulation demodulation locking. For Dual Side Band (DSB) and Electronic Side Band (ESB), only the upper half ($\omega \geq \omega_c$) of the modulation structure is shown. The solid curve represents $|F(\omega)|^2$ and the dashed curve represents $\angle F(\omega)$, where $F(\omega)$ is the amplitude reflection coefficient of the cavity. For the frequency tunable cases, the arrow labeled "tune" indicates the frequency spacing that is adjusted to tune the carrier, denoted by a thick line.

If the carrier is not perfectly in resonance, a portion of it will reflect and generate an intensity modulation in the reflected light by interfering with the reflected sidebands. It can be shown that the reflected light power with angular frequency $\Omega$ is given to first order in the modulation depth $\beta$ by the following:

$$P_{ref,106} = 2P_0 J_0(\beta) J_1(\beta) Re[F(\omega_c)F^*(\omega_c+\Omega) - F^*(\omega_c)F(\omega_c-\Omega)]\cos(\Omega t) + 2P_0 J_0(\beta) J_1(\beta) Im[F(\omega_c)F^*(\omega_c+\Omega) - F^*(\omega_c)F(\omega_c-\Omega)]\sin(\Omega t) \quad \text{Equation (4)}$$

where $J_n(x)$ is the nth-order Bessel function of the first kind. When the carrier is near resonance, the bracketed term in equation (4) is purely imaginary and proportional to $\delta v$, the frequency offset between the carrier and the cavity resonance. The proportionality constant is known as the frequency discriminant, which for a two-mirror cavity is given by $$D_{PDH} = -\frac{16FLP_0}{c} J_0(\beta) J_1(\beta) \quad \text{Equation (5)}$$

An error signal suitable for locking to the cavity resonance can be generated by measuring $P_{ref,\Omega}$ using a photoreceiver and demodulating the output to recover the $\sin(\Omega t)$ component.

Figure 4A:
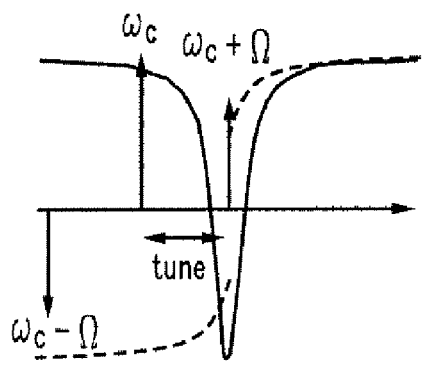
FIG. 4A illustrates an exemplary single sideband (SSB) locking optical frequency spectrum.
Figure 4B:
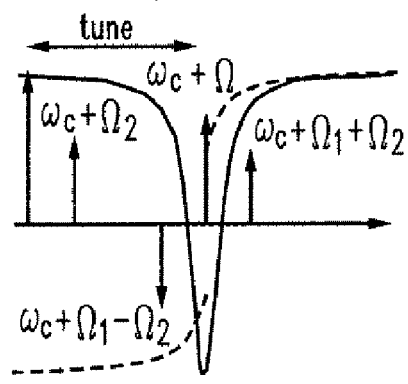
FIG. 4B illustrates an exemplary dual sideband (DSB) locking optical frequency spectrum.
Figure 4C:
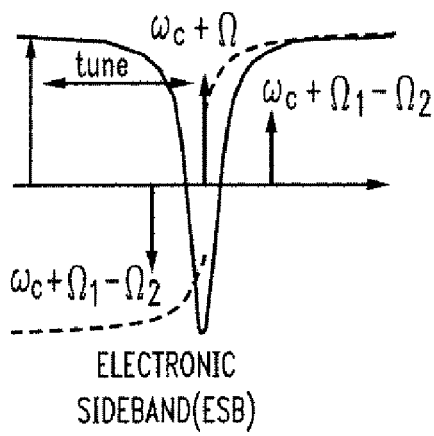
FIG. 4C illustrates an exemplary electronic sideband (ESB) locking optical frequency spectrum.

In one aspect, the system utilizes the phase modulator, which is already an essential component in a PDH stabilization system, to provide simultaneous frequency tuning by modifying the PDH system such that a sideband is locked to the frequency reference and the carrier frequency can be adjusted by changing the phase modulation frequency. FIGS. 4A-C illustrate three phase modulated optical spectra that can be used to implement this technique.

Figure 6:
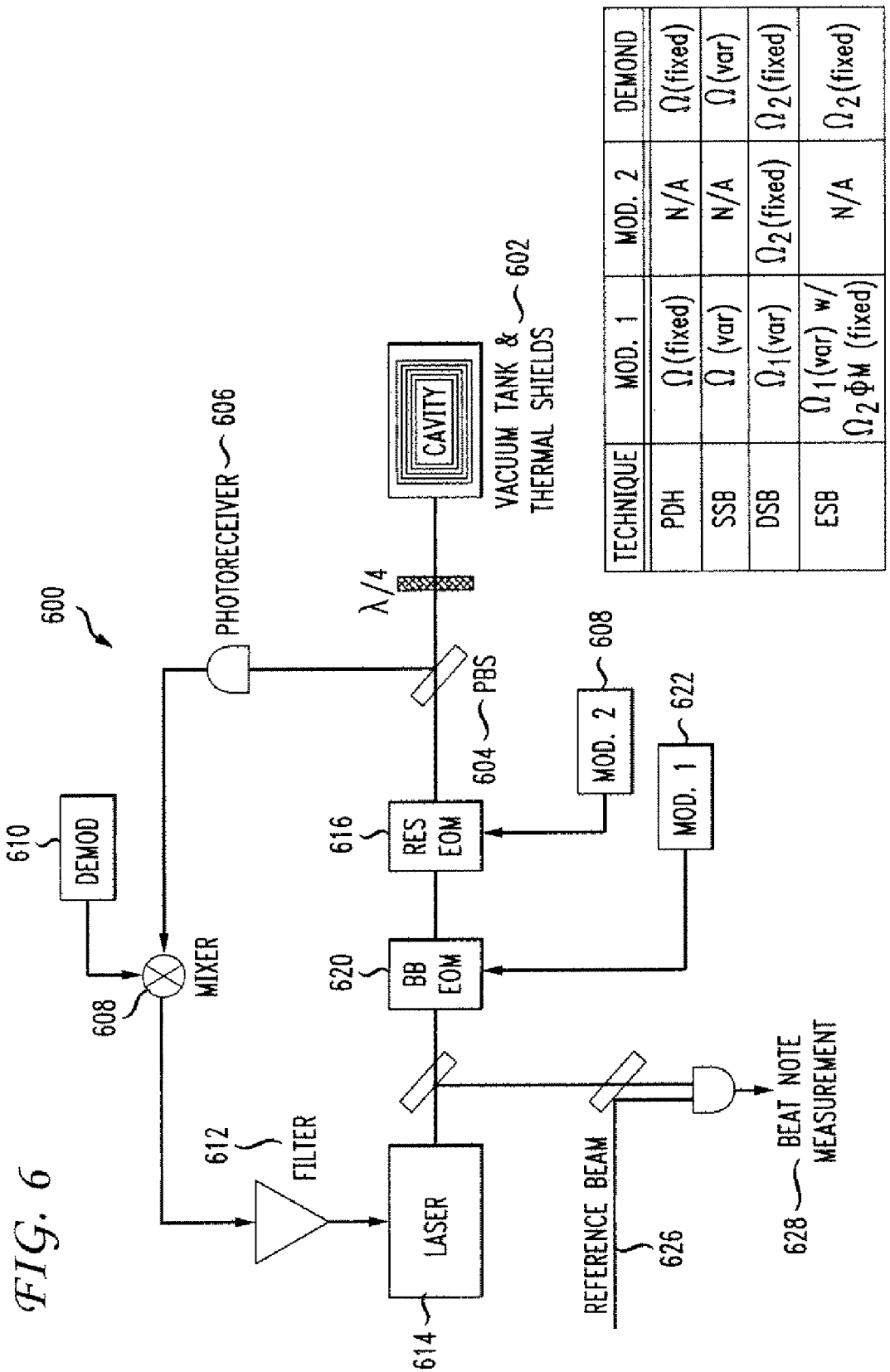
FIG. 6 illustrates an exemplary locking laser configurable for PDH, SSB, DSB, or ESB operation.

FIG. 4A illustrates an exemplary single sideband (SSB) locking optical frequency spectrum. FIG. 4B illustrates an exemplary dual sideband (DSB) locking optical frequency spectrum. FIG. 4C illustrates an exemplary electronic sideband (ESB) locking optical frequency spectrum. In each of these techniques, phase modulation is used to generate a sideband which is locked to the cavity resonance. The frequency of the carrier is then adjusted by changing the frequency used to generate the sideband. In practice, a portion of the source beam is picked off and used to perform the frequency stabilization. The remaining light, free of any modulation sidebands, tracks the frequency of the carrier. The beam going from the laser 614 to the beat note measurement 628 in FIG. 6 illustrates one example of this technique.

The SSB approach uses the same modulation spectrum as PDH with the exception that one of the sidebands is locked to the frequency reference rather than the carrier. This technique is simple but more sensitive to certain noise sources due to the asymmetry of the modulation spectrum about the frequency reference. The SSB technique is the simplest modification to the standard PDH technique that provides tunability. The same modulation scheme is used, but with the modulation frequency $\Omega$ being adjustable and with one of the sidebands locked to the resonance rather than the carrier. See FIG. 4A. The expression for $P_{ref,\Omega}$ in equation (4) is still valid only one of the sidebands is resonant while the other sideband and the carrier are reflected. If the resonance frequencies are redefined as $\omega_n \equiv 2\pi n \cdot FSR + (-)\Omega$ for locking on the upper(lower) sideband, the $\sin(\Omega t)$ component is proportional to $\delta v$ with a discriminate given by $$D_{SSB} = \frac{8FLP_0}{c} J_1(\beta)[j_0(\beta) - J_2(\beta)] \quad \text{Equation (6)}$$

The $J_2(\beta)$ term arises from interference between the resonant sideband and a second sideband at $\omega_c \pm 2\Omega$ that appears when the expansion of equation (3) is taken to higher orders in $\beta$. For small $\beta$, $D_{SSB}$ is of opposite sign and a factor of two lower than $D_{PDH}$. Once one of the sidebands is locked to the cavity resonance, the carrier frequency can be tuned by adjusting $\Omega$.

The DSB technique restores this symmetry by introducing two sinusoidal phase modulations using the phase modulator. The DSB technique also allows the detection and demodulation components to be optimized for a particular frequency since the demodulation frequency is fixed at $\Omega_2$. One potential drawback of the DSB technique is that the modulation structure produces a strong error signal when the carrier is in resonance that can interfere with locking on the desired error signal. The dual sideband (DSB) technique uses a modulation spectrum that is identical to that used for PDH locking with a tunable offset from the carrier. This can be accomplished by modulating the beam at two distinct frequencies, one of which is adjustable. Consider a light beam with power $P_0$ and angular frequency $\omega_2$, that is phase-modulated with two sinusoidal signals of depth $\beta_i$, and angular frequency $\omega_i$ (i=1, 2). The electric field is given by $$\vec{E}_{DSB} = \sqrt{P_0} \exp\{i[\omega_c t + \beta_1 \sin(\Omega_1 t) + \beta_2 \sin(\Omega_2 t)]\} \quad \text{Equation (7)}$$

Expanding to first order in $\beta_{1,2}$, the result of the phase modulation is a carrier with angular frequency $\omega_c$, sidebands with angular frequencies $\omega_c \pm \Omega_1$, sidebands with angular frequencies $\omega_c \pm \Omega_2$, and sub-sidebands at $\omega_c + \Omega_1 \pm \Omega_2$ and $\omega_c - \Omega_1 \pm \Omega_2$.

The modulated spectrum form $\omega_c \geq \omega_c$, is shown in FIG. 1(c) assuming $\Omega_1 > \Omega_2$ and $\beta_1 > \beta_2$. Note that the spectral structure centered around $\omega_c + \Omega_1$ with sidebands offset by $\Omega_2$ is analogous to the PDH modulation spectrum in FIG. 3. In DSB locking, this structure (or the analogous one at $\omega_c - \Omega_1$) is used to generate an error signal by placing one of the $\omega_c \pm \Omega_1$ sidebands on resonance and demodulating the reflected power with $\Omega_2$. The frequency discriminate is given by $$D_{DSB} = \frac{16FLP_0}{c} J_1^2(\beta_1) J_0(\beta_2) J_1(\beta_2) \quad \text{Equation (8)}$$

A value of $\beta_1 \approx 1.84$ gives the maximum ratio of $D_{DSB}/D_{PDH} \approx 0.34$, assuming $\beta_2$ in equation (8) is equal to $\beta$ in (5). Frequency tuning of the carrier can be accomplished by adjusting $\Omega_1$.

One potential disadvantage of the DSB technique is that the complex modulation structure leads to the generation of spurious error signals. This can make lock acquisition challenging and also provides potential pathways for noise to enter the system. In particular, a Pall error signal will be generated when the carrier is in resonance and the power is demodulated by $\Omega_2$. If the modulation depth of the first modulator is not large enough to sufficiently suppress the carrier, this error signal may even be larger than the desired DSB error signal. The situation becomes even more complex when additional resonances due to higher-order cavity spatial modes are introduced.

The ESB technique remedies this by eliminating the $\omega_c \Omega_2$ sidebands. The required optical spectrum can be generated by driving the optical phase modulator with an electrical signal with nominal frequency $\Omega_1$ that is itself phase modulated at a frequency $\Omega_2$.

These approaches provide at least three distinct advantages and benefits. First, these techniques can provide the ability to tune a very large number of free-spectral ranges. A free-spectral range is the spacing in frequency between resonances of the reference, usually an optical cavity such as a Fabry-Perot etalon. The tuning range is limited by the bandwidth of the phase modulator. Second, frequency tuning does not sacrifice frequency stability at measurement frequencies of interest because the additional noise from adding tunability is masked by thermal noise in the reference cavity. At other frequencies the additional noise that is added can be quantified, and it represents a small increment over the fundamental laser shot noise limit. Third, these techniques require no additional components and little or no modification to the existing components used in standard PDH locking.

The ESB technique simplifies the modulated spectrum of the DSB technique by eliminating the $\omega_c \pm \Omega_2$ sidebands. This can be accomplished by driving a single broadband EOM with a phase-modulated drive signal. The drive signal has a carrier frequency of $\Omega_1$ and is phase-modulated at $\Omega_2$ with a depth of $\beta_2$. This signal is then used to drive the phase modulator with a depth of $\beta_1$. The electric field of the light exiting the modulator is of the form $$\vec{E}_{ESB} = \sqrt{P_0} \exp\{i[\omega_c t + \beta_1 \sin(\Omega_1 t + \beta_2 \sin(\Omega_2 t))]\} \quad \text{Equation (9)}$$

Expanding to first order in $\beta_i$, the spectrum is identical to the DSB structure with the exception that the $\omega_c \pm \Omega_2$ sidebands are removed. FIG. 4C shows this spectrum for $\omega \geq \omega_c$. The error signal is generated by placing one of the $\omega_c \pm \Omega_1$ sidebands near resonance and demodulating with $\Omega_2$. As with DSB, the carrier is tuned by adjusting $\Omega_1$.

The power in the $\Omega_c \pm \omega_1$ sidebands and the $\omega_c \pm \Omega_1 \pm \Omega_2$ sub-sidebands is the same as for the DSB case. As a result, the frequency discriminant for ESB locking is identical to that given in (8) for DSB. The power in the carrier is increased to $P_0 J_0^2(\beta_1)$ for ESB versus $P_0 J_0^2(\beta_1) P_0 J_0^2(\beta_2)$ for DSB.

551 FIG. 5A illustrates an exemplary SSB implementation. This implementation includes one oscillator 502 coupled to an electro-optic modulator (EOM) 504 represented by $\Omega$. This implementation corresponds to FIG. 4A. The SSB implementation is typically the simplest to implement, although it can produce some noise coupling due to asymmetry.

561 FIG. 5B illustrates an exemplary DSB implementation. This implementation includes two oscillators 506, 510 connected in series represented by $\Omega_1$ and $\Omega_2$. Each oscillator is coupled to its own individual EOM 508, 512. This implementation corresponds to FIG. 4B. The DSB implementation restores PDH symmetry and can generate a complex modulation pattern.

FIG. 5C illustrates an exemplary ESB implementation. This implementation includes two oscillators 514. 516 represented by $\Omega_1$ and $\Omega_2$, one 514 connected to a phase modulation input of the other 516. The group of two is then coupled to the EOM 518. This implementation corresponds to FIG. 4C. The ESB implementation generates a simple, symmetric modulation pattern, but requires phase modulation capability of 516.

FIG. 6 illustrates an exemplary locking laser 600 configurable for PDH, SSB, DSB, or ESB operation. To operate as a PDH locking laser, $\Omega$ is fixed in the first modulator 622, the second modulator 618 is non-operative, and $\Omega$ is fixed in the demodulator 610. To operate as a SSB locking laser, $\Omega$ is variable in the first modulator 622, the second modulator 618 is non-operative, and $\Omega$ is variable in the demodulator 610. To operate as a DSB locking laser, $\Omega_1$ is variable in the first modulator 622, $\Omega_2$ is fixed in the second modulator 618, and $\Omega_2$ is fixed in the demodulator 610. To operate as an ESB locking laser, $\Omega_1$ is variable with $\Omega_2$ ϕM being fixed in the first modulator 622, the second modulator 618 is non-operative, and $\Omega_2$ is fixed in the demodulator 610. The locking laser 600 can dynamically change between operational modes on the fly. FIG. 6 can include a controller 221 such as the one shown in FIG. 2. The controller 221 can connect to the mixer 608, demodulator 610, controller 612, laser 614, BB EOM 620, RES EOM 616, modulator 1 622, modulator 2 608, and/or any other necessary portion of the system.

Each of the techniques described above may have subtly different noise performance, tuning range, and component requirements. The specific realization of the technique and its application dictates which of these considerations is most important. The myriad sources of frequency noise in a cavity-stabilization system can be divided into two classes: fundamental and technical. Fundamental noises determine the limiting performance of the system while technical noises can theoretically be eliminated through careful design and execution. Two fundamental noise sources limit the frequency stability of cavity-stabilized lasers: shot noise and cavity thermal noise.

Table 1, shown below, shows shot noise limited frequency noise for each locking technique at optimum modulation depth, assuming perfect contrast in the cavity resonance.

TABLE 1

| Technique | $P_{ref}/P_0$ | $\|D\| \times \left(\frac{FLP_0}{c}\right)^{-1}$ | $\beta_{opt}$ | $S_{shot,\nu}/(S_{shot,\nu})_{PDH}$ |
|---|---|---|---|---|
| PDH | $1 - J_0^2(\beta)$ | $16 J_0(\beta) J_1(\beta)$ | 0* | 1 |
| SSB | $1 - J_1^2(\beta)$ | $8 J_1(\beta)[J_0(\beta) - J_2(\beta)]$ | 0.97 | 4.4 |
| DSB/ESB | $1 - J_1^2(\beta_1) J_0^2(\beta_2)$ | $16 J_1^2(\beta_1) J_0(\beta_2) J_1(\beta_2)$ | $\beta_1 \to 1.84$ $\beta_2 \to 1.01$ | 5.5 |

*This is a theoretical optimum for perfect contrast and no technical noise. When the effects of finite contrast and technical noise are included, the optimum modulation depth will increase.

Shot noise will generate white optical power noise at the photoreceiver with a level of $$S_{shot,P} = \sqrt{\frac{2hc}{\lambda} P_{ref}}$$

Equation (10)

where h is Planck's constant, $\lambda$ is the vacuum wavelength of the light, and $P_{ref}$ is the reflected light power on resonance. For a perfectly coupled cavity, $P_{ref}$ will be equal to $P_0$ the total power incident on the modulator(s), less the power of the resonant spectral component.

The frequency noise floor associated with the shot noise limit can be estimated by dividing $S_{shot,P}$ by the frequency discriminant, D. Table (1) lists $P_{ref}$, D, $\beta_{opt}$, the optimal modulation depth for shot noise limited operation, and $S_{shot,\nu}$, the shot-noise limited frequency noise floor for $\beta = \beta_{opt}$. The shot noise floors for the sideband systems in table (1) are five to six times larger than the floor for the traditional PDH system, $$(S_{shot,\nu})_{PDH} = \frac{1}{8LF} \sqrt{\frac{hc^3}{P_0 \lambda}}$$

Equation (11)

$$= (277 \, \mu Hz/\sqrt{Hz}) \left(\frac{20 \text{ cm}}{L}\right) \left(\frac{10^4}{F}\right)$$

$$\left(\frac{1 \, \mu m}{\lambda}\right)^{1/2} \left(\frac{1 \, mW}{P_0}\right)^{1/2}$$

The shot noise level should be compared with the length fluctuations cause by thermal noise of the cavity. It can be estimated the thermal noise floor for a room-temperature optical cavity with an ultra-stable glass spacer, such as a suitable ultra-low-expansion glass, and dielectric-coated mirrors to be roughly ~50 mHz/$\sqrt{Hz}$·(f/1 Hz)$^{1/2}$. In one embodiment intended for space-based operation, the cavity is two mirrors made of ultra-low-expansion glass on a stable length spacer in a vacuum isolated from temperature changes. For Fourier frequencies below ~500 Hz, the shot noise penalty paid for the tunable sideband technique would not effect the fundamental noise limit of the system.

Some of the technical noise sources are also affected by which locking technique is utilized. For example, one direct effect is through the reduction in the discriminant magnitude, which can affect the relative distribution of gain in the control loop. A larger electronic gain can compensate for a smaller frequency discriminant in order to achieve the same level of total closed-loop gain. This redistribution of gain will generally result in an increased coupling of certain technical noises, such as voltage noise in the control filters 222, into the system.

Another potential additive noise source that is present in the error signal is relative intensity noise (RIN). There are several ways in which RIN can couple into the system. In the case of SSB locking, the $\cos(\Omega t)$ component in $P_{ref,\Omega}$,n does not vanish but instead has a magnitude of $2 P_0 J_0(\beta) J_1(\beta)$. An error of $\delta\theta$ in the demodulation phase will allow this term to couple into the error signal at a level of $\approx 1 - \delta\theta^2$, producing an offset. Fluctuations in $P_0$ can cause this offset to vary, thereby introducing noise into the system.

In general the DSB and ESB spectra retain the symmetry of the PDH spectrum and consequently do not produce $\cos(\Omega_2 t)$ terms in the reflected light. Certain values of the modulation frequencies, for example $\Omega_1 = 2\Omega_2$ for DSB, can cause asymmetric interference between the sidebands. This type of interference should be mitigated by maintaining $\Omega_1 \gg \Omega_2$. Other technical noise sources, such as temperature fluctuations or vibrations in the cavity, will affect the sideband systems in the same way as a PDH system. In cases where these noises dominate, adding the feature of frequency tunability does not provide a noise penalty.

The RF components used for modulation/demodulation can limit the tuning range. For each of the techniques, the bandwidth of the electro-optic modulator (EOM) and the associated drive electronics can limit the tuning range. For typical free-space EOMs, bandwidths of ~100 MHz are readily available, although a large amount of RF power is needed to drive these broadband EOMs to sufficient modulation depths. Waveguide modulators can deliver high modulation depths over bandwidths exceeding 10 GHz with low drive powers, making them an attractive option in some applications.

In the SSB case, the demodulation frequency varies and as a result the photoreceiver and mixer bandwidths also limit the tuning range. Since the demodulation frequency remains fixed for DSB and ESB, the bandwidth requirements on the demodulation components is identical as that for PDH. A resonant demodulation system can introduce less noise than a broad band system with equivalent gain.

For systems that do not require continuous tuning, it is possible to achieve an extremely large tuning range through a combination of selecting different cavity resonances and offset sideband locking. A tuning bandwidth of 1-2 FSR would be sufficient for this approach. In this case the tuning range can be limited only by the tuning range of the laser itself.

Limiting the bandwidth of the EOMs, especially when using free-space EOMs can dramatically reduce the amount of RF power needed to achieve a given modulation depth. A resonant EOM can be used in tile PDH case and also in the DSB case if the two modulations a performed using separate EOMs. In this case the second EOM (producing the $\Omega_2$ sidebands and sub-sidebands) can be made resonant. In some cases, the first EOM remains broad band.

The ESB technique can include a somewhat specialized source for generating an adjustable RF carrier with fixed RF phase modulation sidebands. Some commercial function generators do not provide the capability for such a modulation. Some non-limiting options include using a pair of oscillators and all electronic phase modulator or programming a digital waveform generator with the desired function.

One potential non-limiting use of the tunable sideband systems described above is as an initial step in a multi-stage frequency stabilization system where the free-running noise is suppressed by the product of the loop gains. This can be implemented as a series of nested loops in which the set point of each loop is controlled by the succeeding loop. This arrangement remains stable so long as the bandwidth of the loops decreases with each successive stage.

The ability to tune the central frequency of a cavity-stabilized laser while maintaining frequency stability has many potential applications. This capability can be achieved through modifications to the standard Pound-Drever-Hall locking technique. The offset sideband locking techniques are straightforward and require no modifications to the frequency reference. These techniques can also be applied to other frequency references that utilize the Pound-Drever-Hall locking scheme, such as spectroscopic references. Laboratory results indicate that the noise performance of these tunable systems are comparable to the standard Pound-Drever-Hall locking technique, which does not provide frequency tunability.

FIG. 7 illustrates an exemplary method embodiment for tuning a signal frequency in a laser. The method first locking a sideband signal generated by splitting an incoming laser beam to a reference frequency in a phase modulator (702). As discussed above, the sideband signal can be a single sideband (SSB) signal, a dual sideband (DSB) signal, or an electronic sideband (ESB) signal. The various properties and advantages of each are also discussed above. Two separate electro-optic modulators, such as a broadband modulator and a resonant modulator, can produce the DSB signal. If the sideband signal is a DSB signal, the method can further introduce two sinusoidal phase modulations at the phase modulator. If the sideband signal is an ESB signal, the method can further drive the optical phase modulator with an electrical signal with nominal frequency $\Omega_1$ that is phase modulated at a frequency $\Omega_2$. Finally, the method adjusts a carrier frequency relative to the locked sideband signal by changing a phase modulation frequency input to the phase modulator (704).

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein may be applied to accurately determining distances between multiple spacecraft, measuring tolerances of machined parts, or measuring other distances. Those skilled in the art will readily recognize various modifications and changes that may be made to the principles described herein without following the example embodiments and applications illustrated and described herein, and without departing from the spirit and scope of the disclosure.

We claim:

1. A method of stabilizing a laser to a frequency reference with an adjustable offset, the method comprising:
   in a phase modulator, locking a sideband signal generated by passing an incoming laser beam through the phase modulator to the frequency reference; and
   adjusting a carrier frequency relative to the locked sideband signal by changing a phase modulation frequency of a modulation signal input to the phase modulator.

2. The method of claim 1, wherein the sideband signal is a single sideband (SSB) signal.

3. The method of claim 1, wherein the sideband signal is a dual sideband (DSB) signal.

4. The method of claim 3, wherein two separate electro-optic modulators produce the DSB signal.

5. The method of claim 4, wherein the two separate electro-optic modulators comprise a broadband modulator and a resonant modulator.

6. The method of claim 3, the method further comprising, at the phase modulator, introducing two sinusoidal phase modulations.

7. The method of claim 1, wherein the sideband signal is an electronic sideband (ESB) signal.

8. The method of claim 7, the method further comprising: driving the optical phase modulator with an electrical signal with nominal frequency $\Omega_1$ that is phase modulated at a frequency $\Omega_2$.

9. A system for generating a laser with an adjustable offset, the system comprising:
- a phase modulator that locks a sideband signal generated by passing an incoming laser beam through the phase modulator to a frequency reference; and
- a module configured to adjust a carrier frequency relative to the locked sideband signal by changing a phase modulation frequency input to the phase modulator.

10. The system of claim 9, wherein the sideband, signal is a single sideband (SSB) signal.

11. The system of claim 9, wherein the sideband signal is a dual sideband (DSB) signal.

12. The system of claim 11, wherein two separate electro-optic modulators produce the DSB signal.

13. The system of claim 12, wherein the two separate electro-optic modulators comprise a broadband modulator and a resonant modulator.

14. The system of claim 9, wherein the sideband signal is an electronic sideband (ESB) signal.

15. A system for generating a laser with an adjustable offset, the system comprising:
- a phase modulator that locks a sideband signal generated by passing an incoming laser beam through the phase modulator to a frequency reference; and
- a module configured to adjust a carrier frequency relative to the locked sideband signal by changing a digitally generated phase modulation frequency input to the phase modulator.

16. The system of claim 15, wherein the sideband signal is a single sideband (SSB) signal.

17. The system of claim 15, wherein the sideband signal is a dual sideband (DSB) signal.

18. The system of claim 17, wherein two separate electro-optic modulators produce the DSB signal.

19. The system of claim 15, wherein the sideband signal is an electronic sideband (ESB) signal.

20. The system of claim 15, further comprising a controller which controls at least one of a demodulator, the phase modulator, the laser, and the phase modulation frequency input.

* * * * *